(12) United States Patent
Scharp et al.

(10) Patent No.: US 8,616,161 B2
(45) Date of Patent: Dec. 31, 2013

(54) PISTON FOR AN INTERNAL COMBUSTION ENGINE AND METHOD FOR ITS PRODUCTION

(75) Inventors: Rainer Scharp, Vaihingen (DE); Klaus Keller, Lorch (DE)

(73) Assignee: MAHLE International GmbH, Stuttgart (DE)

( * ) Notice: Subject to any disclaimer, the term of this patent is extended or adjusted under 35 U.S.C. 154(b) by 125 days.

(21) Appl. No.: 13/066,549

(22) Filed: Apr. 18, 2011

(65) Prior Publication Data
US 2012/0145112 A1 Jun. 14, 2012

(30) Foreign Application Priority Data
Dec. 9, 2010 (DE) .......................... 10 2010 053 925

(51) Int. Cl.
*F01P 1/04* (2006.01)
*B23P 15/10* (2006.01)
(52) U.S. Cl.
USPC ................ 123/41.35; 29/888.04; 29/888.024
(58) Field of Classification Search
USPC ....................................................... 123/193.6
See application file for complete search history.

(56) References Cited

U.S. PATENT DOCUMENTS

| | | | |
|---|---|---|---|
| 4,581,983 A * | 4/1986 | Moebus ........................... | 92/186 |
| 6,502,539 B2 * | 1/2003 | Ribeiro et al. ............. | 123/193.4 |
| 6,622,613 B1 | 9/2003 | Kortas et al. | |
| 7,302,927 B1 * | 12/2007 | Scharp ........................ | 123/193.6 |
| 7,677,134 B2 * | 3/2010 | Kitsunai et al. .............. | 74/551.8 |
| 2009/0288632 A1 * | 11/2009 | Scharp ........................ | 123/193.6 |
| 2012/0037114 A1 | 2/2012 | Keller et al. | |

FOREIGN PATENT DOCUMENTS

| | | |
|---|---|---|
| DE | 199 10 582 | 9/2000 |
| DE | 10 2010 020 227 | 11/2011 |
| DE | 10 2010 033 882 | 2/2012 |
| EP | 1 327 089 | 7/2003 |

OTHER PUBLICATIONS

German Search Report dated Mar. 26, 2012 in German Patent Application No. 10 2010 053 925.2 with English translation of relevant parts.

* cited by examiner

*Primary Examiner* — Lindsay Low
*Assistant Examiner* — Syed O Hasan
(74) *Attorney, Agent, or Firm* — Collard & Roe, P.C.

(57) ABSTRACT

A method for the production of a piston for an internal combustion engine, having a circumferential cooling channel, whereby a blank of a lower piston part is forged, and a blank of an upper piston part is produced, the blanks are pre-machined and joined together to form a piston blank, which is finished to produce a piston. At least one depression or recess is formed into the blank of the lower piston part during the forging process. In the finished piston, the depression forms an opening for a coolant inflow and/or a coolant outflow, or the recess forms an excavation groove for a pin securing ring, respectively.

6 Claims, 3 Drawing Sheets

PISTON FOR AN INTERNAL COMBUSTION ENGINE AND METHOD FOR ITS PRODUCTION

CROSS REFERENCE TO RELATED APPLICATIONS

Applicant claims priority under 35 U.S.C. §119 of German Application No. 10 2010 053 925.2 filed on Dec. 9, 2010, the disclosure of which is incorporated by reference.

BACKGROUND OF THE INVENTION

1. Field of the Invention

The present invention relates to a method for the production of a piston for an internal combustion engine, having a circumferential cooling channel, whereby a blank of a lower piston part is forged, and a blank of an upper piston part is produced, the blanks are pre-machined and joined together to form a piston blank, which is finished to produce a piston. The present invention furthermore relates to a method for the production of a piston for an internal combustion engine, whereby a blank of a lower piston part is forged, and a blank of an upper piston part is produced, the blanks are pre-machined and joined together to form a piston blank, which is finished to produce a piston. Finally, the present invention relates to such pistons for an internal combustion engine.

2. The Prior Art

In forged piston parts, openings such as those for the coolant inflow and the coolant outflow in a cooling channel, for example, have been produced by means of drilling. In this connection, sharp cutting edges occur, at which great stresses can lead to cracks. For this reason, the cutting edges must be rounded off manually or by machine, and this involves much effort. Furthermore, openings that deviate from the circular shape must be milled, with great effort. The excavated grooves for the pin securing rings on the pin bores must also be milled or cast, with great effort.

SUMMARY OF THE INVENTION

The task of the present invention consists in further developing a method of this type in such a manner that openings and grooves can be made in the piston components in simple and efficient manner.

A solution consists in that at least one depression is formed into the blank of the lower piston part during the forging process, that a circumferential lower cooling channel is worked in during pre-machining of the blank of the lower piston part, in such a manner that the at least one depression forms an opening for a coolant inflow and/or a coolant outflow. Another solution consists in that at least one recess is formed into the blank of the lower piston part during the forging process, that a pin bore is worked in during pre-machining of the blank of the lower piston part, in such a manner that the at least one recess forms an excavation groove for a pin securing ring. Furthermore, pistons that can be produced by means of such methods are the object of the present application. In particular, a piston having a lower piston part and an upper piston part, whereby the lower piston part and the upper piston part form a circumferential, closed cooling channel, and the cooling channel has at least one opening for a coolant inflow and/or a coolant outflow, the opening being formed from a forged depression, is an object of the present application.

The idea according to the invention consists in forming structures such as bores and grooves into a piston component during the forging process, in such a manner that chip-cutting machining such as drilling and milling to produce these structures is eliminated. To produce a coolant inflow or a coolant outflow in a circumferential cooling channel, depressions are formed into the blank of the lower piston part, for example. The forging process brings with it that these depressions are directly rounded, so that no dangerous stresses that can lead to crack formation will occur. Complicated drilling and milling as well as subsequent manual or machine rounding are eliminated. During the subsequent introduction of the lower cooling channel part into the blank of the lower piston part, these depressions are exposed, and thus the coolant inflow and the coolant outflow, respectively, are formed. In comparable manner, at least one recess can be formed in that region of the blank of the lower piston part in which the pin bores are provided in the finished piston, during the forging process, the recess forming an excavation groove for the pin securing rings after production of the pin bores. Re-machining of this recess is also not necessary.

Advantageous further developments are evident from the dependent claims.

The at least one depression is preferably worked in such a manner that an opening for a coolant inflow and/or a coolant outflow having a non-round cross-section is obtained. The cross-sections of the opening(s) for coolant inflow or coolant outflow can be freely selected, depending on the requirements.

The at least one excavation groove for the pin securing ring can be re-machined, if desired, particularly during the course of the surface machining of the pin boss regions.

It is practical if the blanks of upper piston part and lower piston part are joined by means of a welding method, for example by means of friction welding, beam welding, laser welding, etc.

BRIEF DESCRIPTION OF THE DRAWINGS

Exemplary embodiments of the present invention will be explained in greater detail below, using the attached drawings. These show, in a schematic representation, not true to scale.

DETAILED DESCRIPTION OF THE PREFERRED EMBODIMENTS

Figure 4:
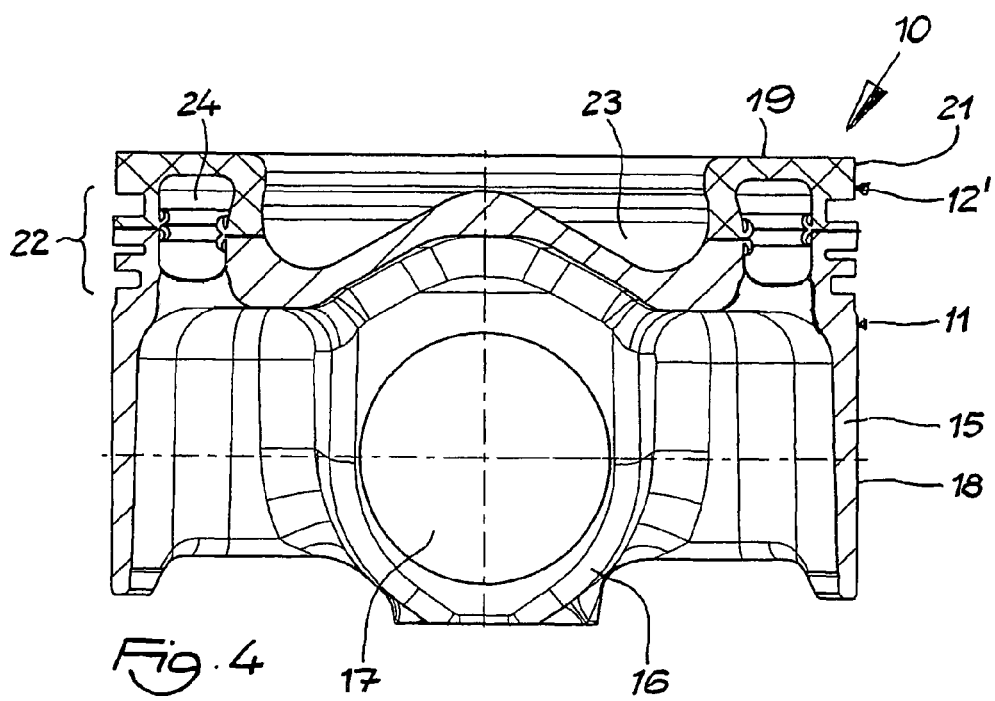
FIG. 4 the piston according to the invention, produced from the piston blank according to FIG. 3, in section.

FIG. 4 shows an exemplary embodiment of a finished piston 10 according to the invention. The piston 10 consists of a lower piston part 11 and an upper piston part 12. The lower piston part 11 can consist of any metallic material that is suitable for forging. The upper piston part 12 can consist of any metallic material that can be connected with the material of the lower piston part 11, to produce a piston blank.

In the exemplary embodiment, the lower piston part 11 consists of a steel material, for example 42CrMo4. The lower piston part 11 has a piston skirt 15, which is provided, in known manner, with pin bosses 16 and pin bores 17 for accommodating a piston pin (not shown), as well as with skirt regions having working surfaces 18. In the exemplary embodiment, the upper piston part 12 is also produced from a steel material, for example 38MnVS6. The upper piston part 12 has a piston crown 19 as well as a circumferential top land 21. In this exemplary embodiment, the lower piston part 11 and the upper piston part 12 form a circumferential ring belt 22 for accommodating piston rings (not shown), as well as a combustion chamber bowl 23. The lower piston part 11 and the upper piston part 12 furthermore form a circumferential, closed cooling channel 24. In the exemplary embodiment, the lower piston part 11 and the upper piston part 12 are connected with one another in known manner, by means of friction welding.

Figure 1:
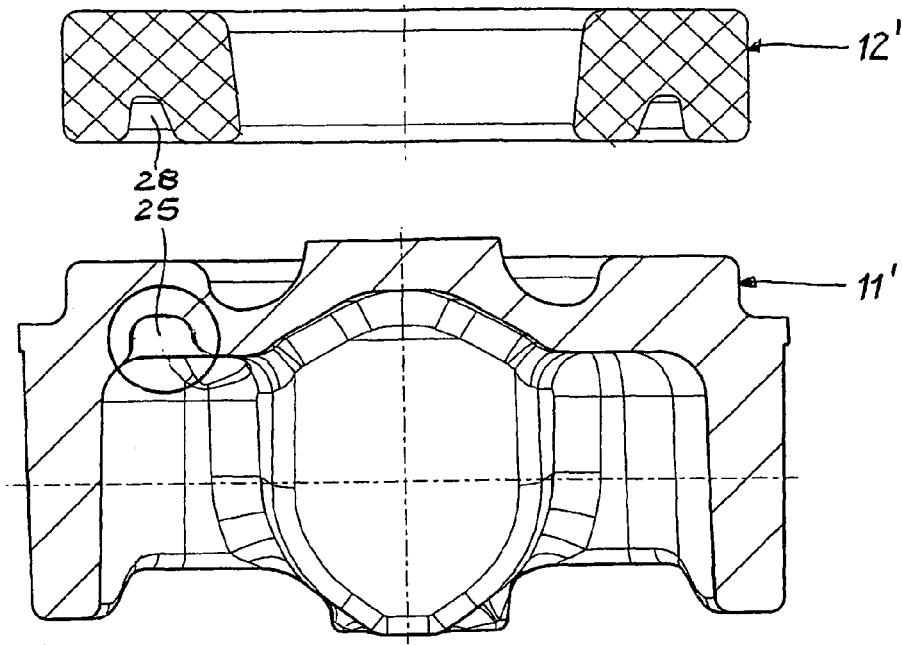
FIG. 1 an exemplary embodiment of a forged blank of a lower piston part and a forged blank of an upper piston part, for the production of a piston according to the invention, in section.

The piston 10 according to the invention is produced in the manner described below, as is evident from FIGS. 1 to 3.

The lower piston part 11 and, in this exemplary embodiment, the upper piston part 12 are forged components. According to FIG. 1, first a blank 11' of a lower piston part 11 and a blank 12' of an upper piston part 12 are forged. According to the invention, a depression 25 is formed in the blank 11' in the region indicated with a circle, during the course of the forging process. The depression 25 is disposed in that region of the blank 11' into which a partial region of the cooling channel 24 is worked before joining of the pre-machined blanks 11', 12'. The blanks 11', 12' furthermore have smooth mantle surface regions 26, 27 for later accommodation of the ring belt 22. The blank 12' of the upper piston part 12 furthermore has a ring-shaped, circumferential groove 28 that is disposed in that region of the blank 12' into which a partial region of the cooling channel 24 is worked before joining of the pre-machined blanks 11', 12'.

Figure 2:
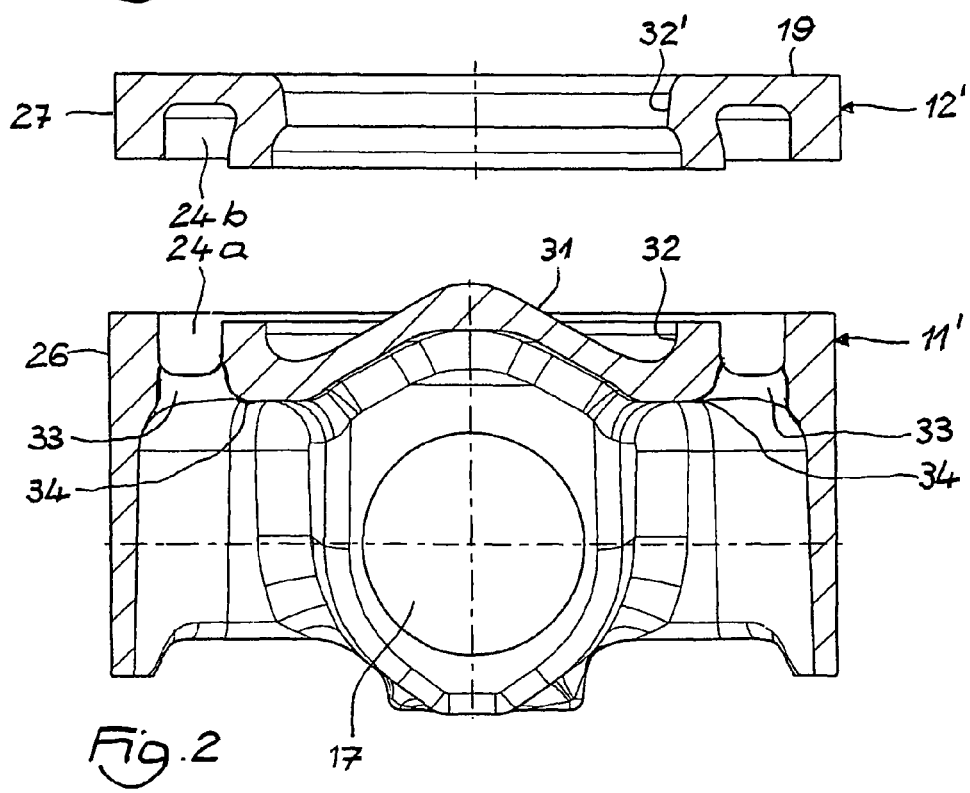
FIG. 2 the blanks according to FIG. 1 after pre-machining.

The pre-machined blanks 11', 12' of lower piston part 11 and upper piston part 12, prepared for joining, are shown in FIG. 2. In the exemplary embodiment, the crown region 31 and a part 32 of the wall region of the combustion chamber bowl 23 are worked, for example lathed, into the blank 11' of the lower piston part 11. Furthermore, a circumferential lower cooling channel part 24a of the cooling channel 24 is worked in, for example lathed in. The lower cooling channel part 24a is introduced into the blank 11' in such a manner that the depression 25 is exposed and an opening 33 is formed, which can serve as a coolant inflow and/or a coolant outflow in the finished piston. Depending on the configuration of the depression 25, the opening 33 can particularly have a round or oval cross-section. The lower edge 34 of the opening 33 is directly rounded off, because of the forging process with which the depression 25 was formed into the blank 11', in other words it does not have any kind of sharp edges so that no dangerous stresses occur in this region that can lead to crack formation. Furthermore, the pin bosses 16, the pin bores 17, and the working surfaces 18 were worked into the blank 11'. In the exemplary embodiment, the remaining part 32' of the wall region of the combustion chamber bowl 23 is worked, for example lathed, into the blank 12' of the upper piston part 12. Furthermore, a circumferential upper cooling channel part 24b of the cooling channel 24 is worked in. Furthermore, the piston crown 19 is worked into the blank 12'.

Figure 3:
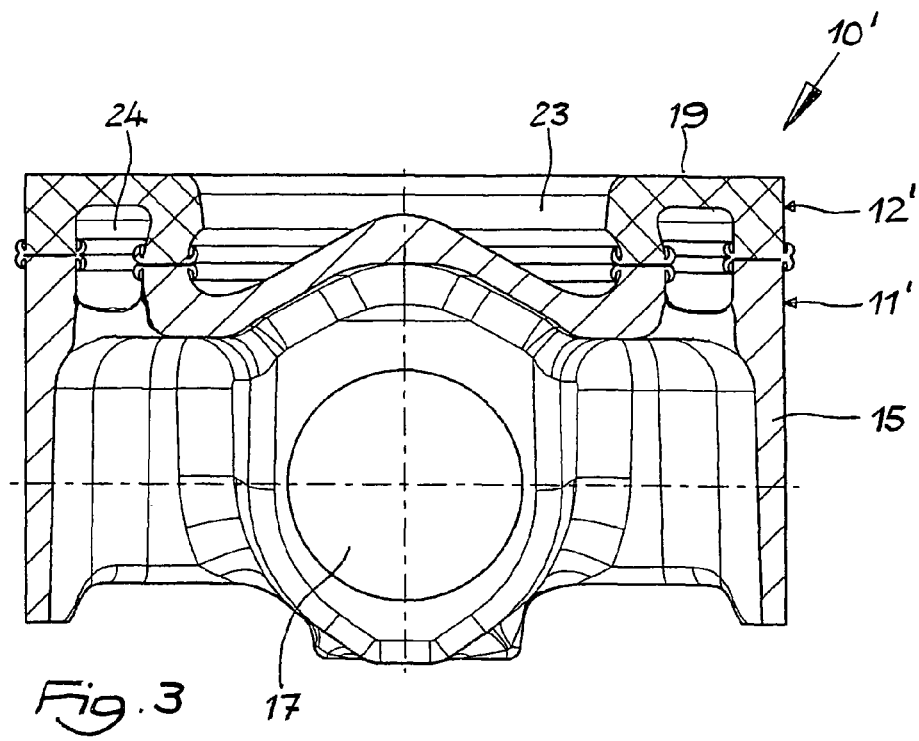
FIG. 3 the piston blank produced from the components according to FIG. 2, for a piston according to the invention, in section.

The two blanks 11', 12' are connected, in known manner, to form a piston blank 10', according to FIG. 3, by means of friction welding, in the exemplary embodiment. The piston blank 10' essentially corresponds to the finished piston 10 according to FIG. 4, so that the same structures are provided with the same reference symbols, and reference is made, in this regard, to the above description of FIG. 4. The piston blank 10' is re-machined or finished in known manner, as a function of the configuration of the blanks 11', 12'. For example, the outer shape, surfaces, combustion chamber bowl 23, pin bores 17, etc. can be finished. In particular, the ring belt 22 is worked in, and outer friction-welding beads are removed. In the end result, the finished piston described above, according to FIG. 4, is obtained.

Figure 5:
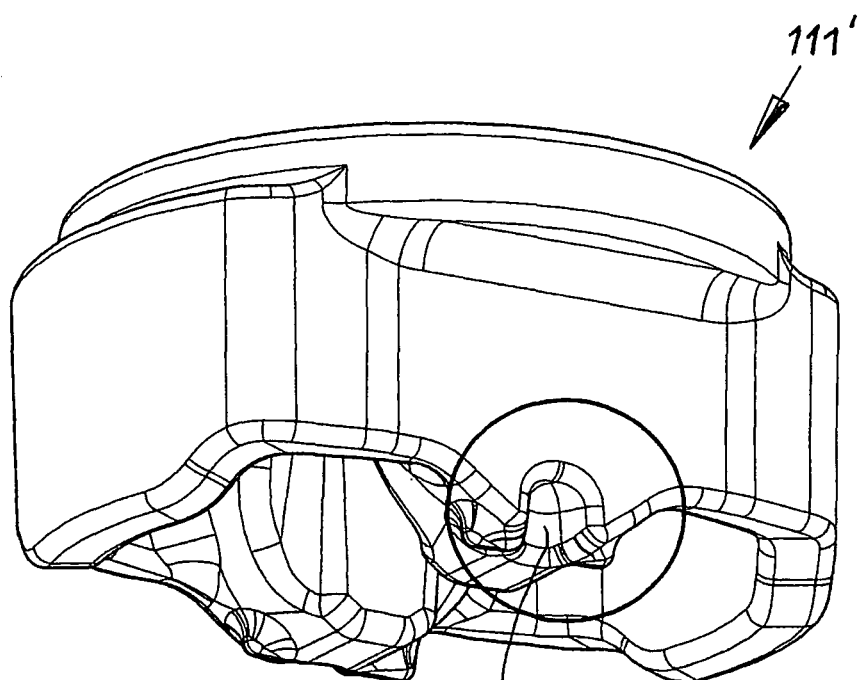
FIG. 5 another exemplary embodiment of a forged blank of a lower piston part for the production of a piston according to the invention, in a perspective representation.
Figure 6:
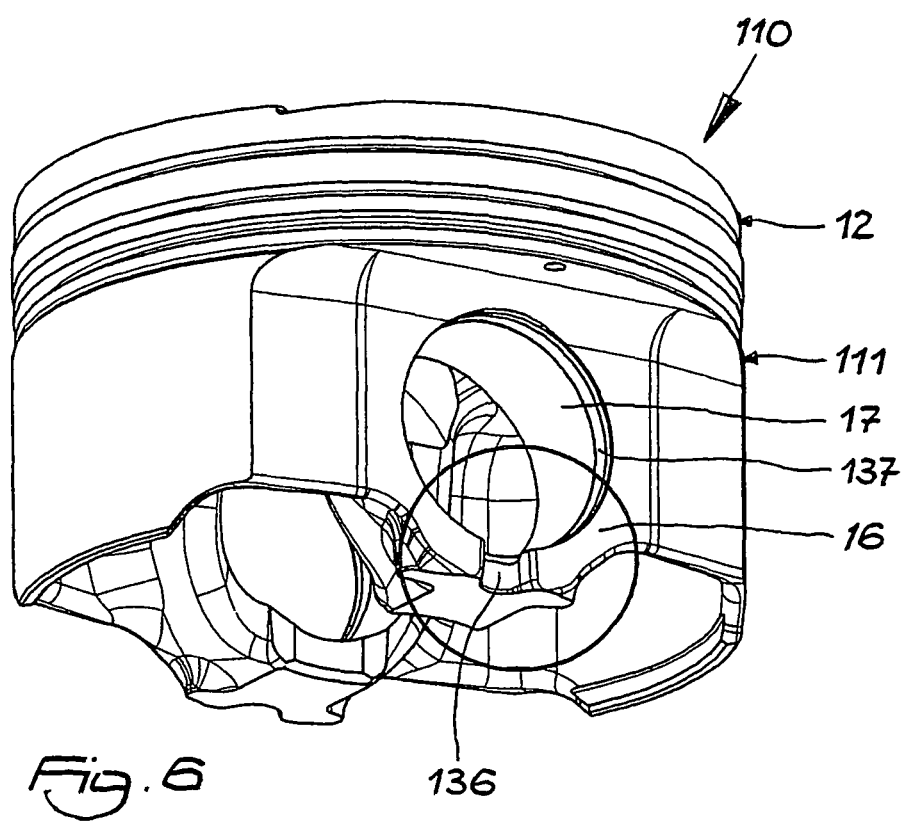
FIG. 6 the piston according to the invention produced from the lower piston part according to FIG. 5 as well as from an upper piston part, in section.

FIG. 5 shows another exemplary embodiment of a blank 111' of a lower piston part 111 for a piston 110 according to the invention, as it is shown in FIG. 6. The piston 110 is produced, using a blank 12' for an upper piston part 12, essentially in the same manner as the piston 10 according to FIG. 4, so that reference is made to the above description, in this regard.

According to the invention, a recess 135 is formed in the blank 111', in the region indicated with a circle, during the course of the forging process. The recess 135 is disposed in that region of the blank 111' in which the pin bosses 16 and the pin bores 17 are worked in, before joining of the pre-machined blanks 111', 12'. The pin bores 17 are introduced into the blank 111' in such a manner that the recess 135 forms an excavation groove 136 in the finished piston, for a pin securing ring (not shown), which ring is accommodated, in known manner, in the finished piston 110, in a securing groove 137. The excavation groove 136 can be re-machined, if necessary. The edge of the excavation groove 136 is directly rounded off, because of the forging process with which the recess 135 was formed into the blank 111', in other words it does not have any kind of sharp edges, so that no dangerous stresses that can lead to crack formation occur in this region.

The invention claimed is:

1. Method for the production of a piston (10) for an internal combustion engine, having a circumferential cooling channel (24), whereby a blank (11') of a lower piston part (11) is forged, and a blank (12') of an upper piston part (12) is produced, the blanks (11', 12') are pre-machined and joined together to form a piston blank (10'), which is finished to produce the piston (10), wherein the lower piston part (11) forms a circumferential ring belt (22) and a combustion chamber bowl (23), wherein said circumferential cooling channel (24) is positioned between said ring belt (22) and said combustion chamber bowl (23), wherein at least one depression (25) is formed into the blank (11') of the lower piston part (11) during the forging process, wherein a circumferential lower cooling channel (24a) is worked in during pre-machining of the blank (11') of the lower piston part (11), in such a manner that the at least one depression (25) is exposed and an opening (33) for a coolant inflow and/or a coolant outflow is formed.

2. Method according to claim 1, wherein the at least one depression (25) is worked in so that an opening (33) for a coolant inflow and/or a coolant outflow having a non-round cross-section is obtained.

3. Method according to claim 1, wherein the blanks (11', 12') of lower piston part (11) and upper piston part (12) are joined by means of a welding method.

4. Method for the production of a piston (110) for an internal combustion engine, whereby a blank (111') of a lower piston part (111) is forged, and a blank (12') of an upper piston part (12) is produced, the blanks (111', 12') are pre-machined and joined together to form a piston blank, which is finished to produce the piston (110), wherein at least one recess (135) is formed into the blank (111') of the lower piston part (111)

during the forging process, wherein a pin bore (17) is worked in during pre-machining of the blank (111') of the lower piston part (111), in such a manner that the at least one recess (135) forms an excavation groove (136) for a pin securing ring.

5. Method according to claim 4, wherein the at least one excavation groove (136) is re-machined.

6. The method according to claim 4, wherein the blanks (111', 12') of the lower piston part (111) and the upper piston part (12) are joined by means of a welding method.

* * * * *